United States Patent [19]

Nakai et al.

[11] Patent Number: 4,890,782
[45] Date of Patent: Jan. 2, 1990

[54] PROCESS FOR THE PRODUCTION OF A COMPOSITE TOOL

[75] Inventors: Tetsuo Nakai; Akio Hara; Shuji Yazu, all of Itami, Japan

[73] Assignee: Sumitomo Electric Industries, Ltd., Osaka, Japan

[21] Appl. No.: 186,082

[22] Filed: Apr. 25, 1988

Related U.S. Application Data

[60] Division of Ser. No. 5,619, Jan. 7, 1987, abandoned, which is a continuation of Ser. No. 717,099, Mar. 28, 1985, abandoned.

[30] Foreign Application Priority Data

Apr. 3, 1984 [JP] Japan ................................. 59-66125
Jun. 1, 1984 [JP] Japan ................................. 59-113706
Jun. 1, 1984 [JP] Japan ................................. 59-113707
Nov. 21, 1984 [JP] Japan ................................. 59-247493

[51] Int. Cl.⁴ .......................................... B23K 20/12
[52] U.S. Cl. ................................... 228/112; 228/114; 228/122; 228/222; 228/254; 76/108 A
[58] Field of Search ................................ 228/112–114, 228/122, 124, 222, 254; 175/329; 76/108 A

[56] References Cited

U.S. PATENT DOCUMENTS 3,452,421  7/1969  Cheng et al. ........................ 228/112
4,333,671  6/1982  Holko et al. ........................ 228/112
4,686,080  8/1987  Hara et al. ......................... 175/329

FOREIGN PATENT DOCUMENTS 0052584   5/1982  European Pat. Off. ............ 228/122
0090657  10/1983  European Pat. Off. ............ 228/122

OTHER PUBLICATIONS

Metals Handbook, Ninth Edition, vol. 6, pp. 609–611, 647–649, 719, and 720, copyright 1983.

Primary Examiner—Nicholas P. Godici
Assistant Examiner—Samuel M. Heinrich
Attorney, Agent, or Firm—Wenderoth, Lind & Ponack

[57] ABSTRACT

A composite tool with a higher bonding strength and higher heat resistance is provided comprising an insert of a hard material such as composite diamond or BN compacts and a support of a hard metal or alloy such as steel and cemented carbides, having a larger volume than the insert, the insert and support being bonded by friction welding through an interlayer of a high strength metal or alloy such as Co and Ni with a thickness of at most 1 mm.

5 Claims, 2 Drawing Sheets

PROCESS FOR THE PRODUCTION OF A COMPOSITE TOOL

This application is a Division of abandoned application Ser. No. 005,619, filed Jan. 7, 1987, which, in turn, is a Continuation application of abandoned application Ser. No. 717,099, filed Mar. 28, 1985.

BACKGROUND OF THE INVENTION

1. Field of the Invention

This invention relates to a composite tool excellent in wear resistance as well as toughness and a process for the production of the same.

2. Description of the Prior Art

Cemented carbides are well known as a tool material excellent in wear resistance and toughness, but are unfavourably compared with tool steels because of being more expensive and brittle. Thus, composite tools of a cemented carbide and steel have been proposed and used, for example, in which the cutting edge consists of the cemented carbide and the residual part consists of the steel. In these composite tools, both the parts are generally bonded by brazing as in the case of, for example, drills and end mills. However, these composite tools have met with the problem that brazing strength is not sufficient and the use thereof at high temperatures is limited. Furthermore, in the case of a composite tool for making a deep hole, wherein the machining part and tool supporting part have a large length, the use of a cemented carbide alloy as only the end machining part and steel as the support part (shank) results in the problem that the dimensional precision is inferior due to lack in toughness in the steel part.

When the whole body of a tool is made of a cemented carbide, however, the tool is expensive and encounters the problem that the shank part is lacking in strength, resulting in a tendency of breakage. When using a cemented carbide alloy having a larger quantity of a binder metal for the shank part, the breakage resistance is so increased that it is made possible to use a cheap tungsten carbide containing somewhat more impurities, but the above described problem cannot completely be solved.

Thus, the commonly used brazing method is taken into consideration. This method is effective when the tool is loaded with a relatively small force, but in general, the joint strength is insufficient because of the limited brazing area. As a method of joining metals with each other, there is used friction welding, but in principle, this method cannot be applied to joining cemented carbides with each other.

On the other hand, diamond compacts obtained by sintering diamond fine powder with a binder of an iron group metal under ultra-high pressure at a high temperature, have a much higher wear resistance than the prior art cemented carbides and are thus suitable for use in cutting tools, wire drawing dies and drill bits. Furthermore, BN compacts using a fine powder of high pressure type boron nitride (cubic boron nitride and wurtzite boron nitride) having a next high hardness to diamond and a less affinity to iron group metals are capable of exhibiting a more excellent performance in cutting of iron group metals having such a high hardness that the cutting is impossible by cemented carbides, and have thus been watched with keen interest.

The diamond or BN compacts have the excellent properties as a tool material, but an ultra-high pressure apparatus is required for the production thereof. Thus, their size and shape are more restricted as compared with those of the cemented carbides.

In general, a tool component is a disc-shaped composite compact A as shown in FIG. 4, which comprises diamond or BN compact 1, base 2 of cemented carbide for supporting compact 1 and intermediate joint layer 3 as described in Japanese patent application OPI (Kokai) No. 54278/81. This composite compact is bonded to a steel holder or shank by brazing as it is disc-shaped or after cutting in a suitable shape, for example, to form a cutter. However, it is found that when the diamond of BN compact is heated at a higher temperature than 700° C. for a certain period of time during the brazing, the properties are degraded.

Therefore, the brazing is carried out using a silver braze having a low melting point. For the general use such as cutting tools, this brazing method using a low melting point braze is sufficient if the cutting tool is used under such a light cutting condition that cutting force is relatively small, but in the case of applying the compact to a use of heavy cutting, e.g. a drill bit for drilling rocks, this brazing method is not sufficient.

In a drill bit, a number of composite compacts A as shown in FIG. 4 are mounted in a bit crown as shown in FIG. 11 (a) and (b) and used as cutters, which is disclosed in, for example. U.S. Pat. No. 4,098,362. When drilling of rocks is carried out using a drill bit fabricated by mounting composite compacts as shown in FIG. 4 in a bit crown with a low melting point braze having a melting point of lower than 700° C., relatively soft rocks such as sandstone can be drilled without a problem, but in the case of drilling hard rocks, some problems are encountered that the compact cutter falls off from the brazed part and the brazed part is moved. A silver braze (e.g., JIS B Ag-1) commonly used as low melting point brazing material has a shearing strength of at most 20 kg/mm$^2$ at room temperature, which strength is markedly lowered at high temperatures. A drill bit meets with a large fluctuation of stress due to that the stress added to the cutting edge is large and rocks are scarcely uniform. Furthermore, even if a drilling fluid such as mud is used, not only the temperature of the edge, but also that of the bit itself rise in the case of drilling a high depth formation. Depending upon the kind of a formation, mud cannot be used sometimes.

When a diamond or boron nitride compact is applied to cutters for heavy cutting of a high hardness workpiece or object, e.g. a drill bit, therefore, it is very important how to fix the compact as shown in FIG. 4 to a bit crown.

SUMMARY OF THE INVENTION

It is an object of the present invention to provide a composite tool with a high bonding strength as well as high heat resistance at the bonded part.

It is another object of the present invention to provide a composite tool comprising a cutter or insert of cemented carbides and a support bonded thereto with a high bonding strength.

It is a further object of the present invention to provide a compact tool comprised of a diamond or high pressure from BN composite compact bonded to a substrate strongly.

It is a still further object of the present invention to provide a process for the production of a composite tool with a higher strength bond.

These objects can be attained by a composite tool comprising a cutter or insert consisting of a hard alloy or a composite compact and a support, preferably having a larger volume than the cutter or insert, the cutter or insert and the support being bonded through a high strength metal or alloy of at most 1 mm in thickness by means of friction welding.

BRIEF DESCRIPTION OF THE DRAWINGS

The accompanying drawings are to illustrate the principle and merits of the present invention in greater detail.

DETAILED DESCRIPTION OF THE INVENTION

The inventors have made efforts to develop an improved composite tool whereby the disadvantages of the prior art tool can be overcome and consequently, have found that a higher bonding strength can be obtained by means of an improved friction welding method when a cemented carbide insert or composite compact insert is bonded to a support to produce a composite tool.

Accordingly, the present invention provides a composite tool comprising an insert of a hard material and a support of a hard metal or alloy preferably having a larger volume than the insert, the insert and support being bonded by means of friction welding through an interlayer of a high strength metal or alloy with a thickness of 1 mm or less. In a preferred embodiment of the present invention, cemented carbides are used as the hard material for the insert or cutter and steels and cemented carbides are used as the hard metal or alloy for the support.

Another preferred embodiment of the present invention consists in a composite compact tool comprising a composite compact consisting of a diamond or high pressure form boron nitride compact containing at least 20% by volume, preferably 50% by volume of diamond or high pressure form boron nitride powder and substrate of hard sintered alloy bonded during sintering at an ultra-high pressure and high temperature directly or through an interlayer with a thickness of at most 0.5 mm to the diamond or high pressure form boron nitride compact, and a support of a hard sintered alloy, preferably having a larger volume than the substrate, bonded to the substrate of the composite compact through a high strength metal or alloy layer with a thickness of at most 1 mm by means of friction welding.

In this specification, the high pressure form boron nitride will be referred to as "BN" simply and defined as including cubic boron nitride (CBN) and wurtzite boron nitride (wBN) as usual.

The present invention will now be illustrated in detail by the accompanying drawings:

When a cemented carbide insert is bonded to a support of steel or cemented carbide preferably having a larger volume than the insert, a sheet of a high strength metal or alloy is held between the insert and support and the insert or support or both are revolved at a high speed, during which heat of friction is generated between the insert and high strength metal or alloy or between the high strength metal or alloy and the support to soften and fluidize the high strength metal or alloy, and the joint part of the insert and support is bonded entirely and uniformly.

Figure 1:
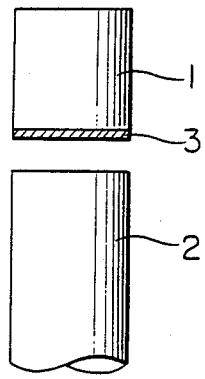
FIG. 1, FIG. 2 and FIG. 3 are schematic views of a cemented carbide insert, joint material and support before and after bonding.
Figure 3:
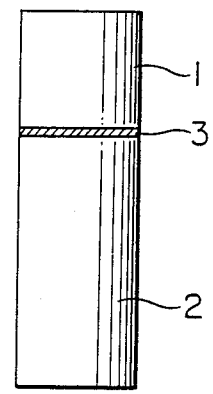

Preferably, a high strength metal or alloy, as joint material 3, is previously bonded to the end surface of cemented carbide insert 1 as shown in FIG. 1 and then subjected to friction welding to steel 2 as shown in FIG. 3. For the purpose of previously bonding joint material 3 to the end surface of insert 1, there are purposed a method comprising during sintering, placing a green powder compact on a metallic sheet as a joint material and then subjecting to bonding, a method comprising exuding a binder metal in a cemented carbide alloy out of the surface thereof, for example, by varying the sintering atmosphere, or a method comprising, after sintering, heating a metal sheet as a joint material at a high temperature under pressure.

Figure 2:
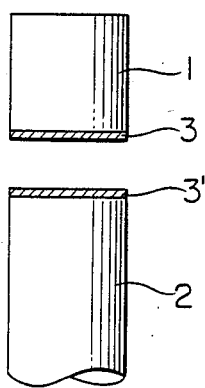

More preferably, a high strength metal or alloy, as joint material 3, is previously bonded to the end surface of cemented carbide insert 1, while a high strength metal or alloy, as joint material 3', is previously bonded to support (shank) 2 of steel or cemented carbides, as shown in FIG. 2, and they are then subjected to friction welding. In this case, it is more preferable for better bonding to use a same high strength metal or alloy to be bonded to the insert and support. Of course, a high strength metal or alloy can previously be bonded to either the insert or support (shank), followed by subjecting to friction welding.

As the high strength metal or alloy for bonding an insert and support in the present invention, there are favorably used iron group metals or alloys containing these as a predominant component.

Above all, Co or Ni is preferable because Co or Ni is also used as a binder metal in cemented carbides to be bonded and scarcely causes metallurgical defects that lower the bonding strength during bonding. When using Ni or Ni alloys as the joint or filler material, in particular, there is very little precipitation of an undesirable mixed carbide phase resulting from, for example, the decomposition of carbides such as WC and (Mo,W)C in cemented carbides and reaction thereof with the metal as the joint material, whereby to give a very high strength bonding.

The thickness of the high strength metal or alloy layer as the joint material is preferably 1 mm or less, since if the thickness exceeds 1 mm, the wear resistance of the high strength metal or alloy layer is lowered.

Up to the present time, bonding of cemented carbides and steels by friction welding has been carried out, but the use of the above described joint or filler material has not been taken into consideration. Therefore, it is difficult to obtain a complete bonding of cemented carbides and steels and even if the conditions of the friction welding are made severer to increase the heat of friction, a good bonding is not obtained, but thermal cracks take place in the cemented carbide part.

One example of the composite tool according to this embodiment is a drill. A number of drills each consisting of a cemented carbide insert brazed to a steel shank have been used at the present time, but cannot avoid the problem that the strength is insufficient, in particular, in the case of making a deep hole or drilling a high strength workpiece. On the contrary, the drill of the present invention can be used without any problem in this respect. In addition to the drill, the composite tool according to the embodiment is useful for end mills, punches, cutters and the like.

Particularly, a composite tool using a support (shnk) of cemented carbide alloy is capable of holding a higher dimensional precision in these uses because of having a much higher toughness than that using steel. In this case, it is preferable to use, as the support, cemented carbides having a larger content or iron group metal than the insert or cutter.

Figure 4:
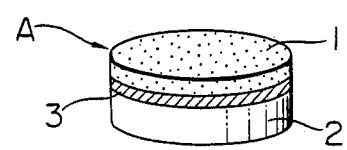
FIG. 4 is a perspective view of one example of a composite compact used in the present invention.
Figure 5:
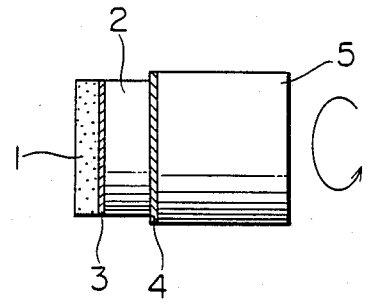
FIG. 5 is a schematic view to illustrate a process for producing a composite compact tool according to the present invention.

Another preferred embodiment of the present invention will be illustrated:

FIG. 5 is a schematic view to illustrate a process for the production of a composite compact tool according to the present invention, which comprises diamond or BN compact 1, cemented carbide base 2 and intermediate joint layer 3, similar to FIG. 4. When composite compact A sintered at an ultra-high pressure and high temperature is bonded to support 5 having a larger volume than the compact, made of a hard alloy, a sheet of a high strength metal or alloy as joint material 4 is sandwiched between substrate 2 and support 5 and then the composite compact or support or both are turned at a high speed, during which heat of friction is generated between the substrate of composite compact and the high strength metal or alloy or between the high strength metal or alloy and the support to soften and fluidize the high strength metal or alloy, and the joint part of the composite compact and support is bonded entirely and uniformly.

Figure 6:
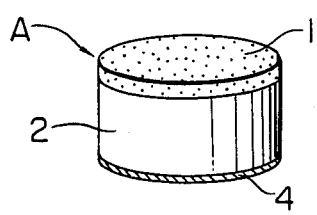
FIG. 6 is a perspective view of another example of a composite compact used in the present invention.
Figure 7:
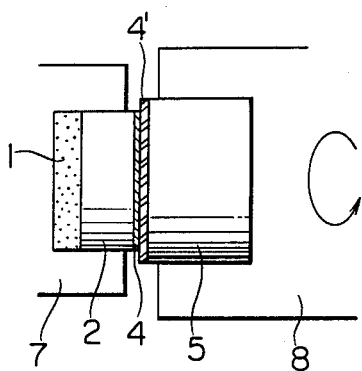
FIG. 7 is a schematic view to illustrate another process for producing a composite compact according to the present invention.

When a composite compact is produced at a high temperature and high pressure, a high strength metal or alloy as joint material 4 can be bonded to the end surface of hard sintered alloy substrate 2 as shown in FIG. 6 and substrate 2 of this composite compact and hard alloy support 5, to which a high strength metal or alloy as joint material 4' is bonded previously, can be subjected to friction welding as shown in FIG. 7. Referring to FIG. 7, 7 is a means for fixing the composite compact and 8 is a means for fixing the support.

In this case, if the high strength metal or alloy bonded to the composite compact substrate is the same as that bonded to the support, bonding proceeds well. Furthermore, a high strength metal or alloy can be bonded to either the composite compact substrate or the hard sintered alloy support and then subjected to friction welding with the hard sintered alloy support or the composite compact substrate.

According to the present invention, it is found that the friction welding is an effective means for bonding the sintered diamond or BN blank without deteriorating the sintered diamond or BN since only the vicinity of the friction part is at a high temperature. In a case where the thickness of the composite compact is small, however, the temperature of the sintered diamond of BN is raised by the conduction of friction heat. In this case, the bonding can be conducted without deteriorating the sintered diamond or BN if the friction welding is carried out while cooling the sintered diamond or BN by a heat sink such as copper.

The substrate 2 (FIG. 4 and FIG. 5) of the diamond or BN compact is made of a hard sintered alloy consisting of at least one of carbides, carbonitrides and nitrides of Group 4a, 5a and 6a elements of Periodic Table, such as WC, TiC, TaC and MoC, bonded with at least one of iron group metals. Preferred examples are hard sintered alloys or cemented carbides of WC, MoC or (Mo, W)C bonded with Co or Ni. For example, a WC-Co alloy has a liquidus temperature of about 1320° C.

The support 5 (FIG. 3 and FIG. 7) used in the present invention is made of the similar hard sintered alloy to that of the substrate 2 (FIG. 4).

As the high strength metal or alloy for bonding the substrate and support according to the present invention, there are favorably used iron group metals or alloy containing these as a predominant component. Above all, Co or Ni is preferable because Co or Ni is also used as a binder metal in hard sintered alloys to be bonded and scarcely causes metallurgical defects that lower the bonding strength during bonding. When using Ni or Ni alloys as the joint or filler material, in particular, there is hardly precipitated an unfavorable mixed carbide phase resulting from, for example, decomposition of carbides such as WC and (Mo, W)C in the hard sintered alloy and reaction thereof with the metal as the joint material during bonding, whereby to give a very high strength bonding.

In this embodiment, the thickness of the high strength metal or alloy layer as the joint material is also preferably 1 mm or less, since if the thickness exceeds 1 mm, the wear resistance of the high strength metal or alloy layer is lowered.

Figure 11A:
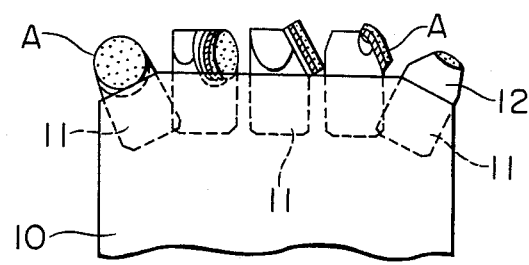
FIG. 11 (a) and (b) are respectively a side view and plan view of one embodiment of a drill bit using a composite compact tool according to the present invention.
Figure 11B:
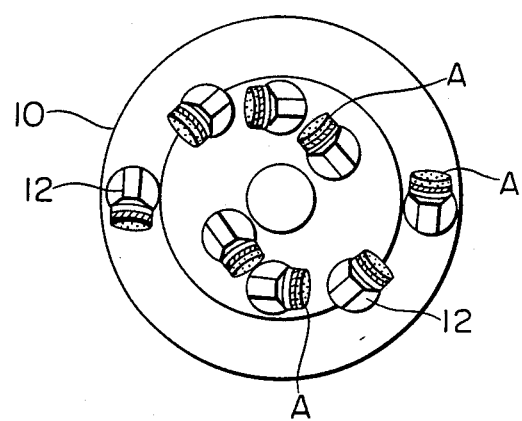

When using the composite compact A according to this embodiment of the present invention as cutters for a drill bit, each cutter can firmly be fixed in a recess 11 provided in the crown of the drill bit as shown in FIG. 11 (a) and (b) by press-fitting or shrink-fitting the support part 12 of the cutter therein. When the support part has a larger volume, in particular, this fixing can be carried out without degrading the diamond or BN compact even by the ordinary brazing method. It will of course be apparent to those skill in the art that bit body 10 of steel itself can be used as the support.

The present invention has been illustrated as to the preferred embodiment when applied to a drill bit, but is of course useful for other uses, for example, cutting tools, drilling tools, dressers of grinding wheel and wear resisting tools, in particular, in case where the joint area of a compact cutter and tool support is relatively small and the bonding strength is lacking by the ordinary brazing method.

The following examples are given in order to illustrate the present invention in greater detail without limiting the same.

EXAMPLE 1

A Ni sheet of 1 mm in thickness was bonded to the end surface of an insert of WC-5% Co with a diameter of 10 mm and length of 20 mm by heating at 1320° C. in vacuum. The WC-5% Co insert and a round bar of SKH 9 with a diameter of 10 mm and length of 120 mm were butted and revolved at a pressure of 1000 kg and 3000 rpm, and then cooled after raising the pressure to 2500 kg.

The Ni and steel at the joint part were flowing and there was retained the Ni sheet with a thickness of 0.1 mm between the cemented carbide and steel. After removing a burr formed by the flowing, the shearing strength of the joint part was measured to thus obtain a value of 65 kg/mm$^2$. On the other hand, a brazed tool for comparison showed a shearing strength of 15 kg/mm$^2$.

EXAMPLE 2

An insert with a diameter of 10 mm and length of 10 mm consisting of a TiC-TiN based cermet, whose surface was covered with a metal consisting essentially of Ni as the binder metal with a thickness of 100 μm, was obtained by sintering and bonded to a die steel with a diameter of 10 mm and length of 100 mm by revolving the insert at 2500 rpm and a pressure of 1100 kg to heat for 1.5 seconds, raising the pressure to 3000 kg, stopping the revolution and cooling.

The shearing strength of the joint part was 60 kg/mm$^2$.

EXAMPLE 3

Inserts of (Mo, W)C-10% Co alloy, Cr$_3$C$_2$-10% Ni alloy and TiN-20% Ni alloy were respectively bonded to a round bar of steel (SK-5) by sandwiching a sheet of Ni, Co or Fe with a thickness of 0.8 mm between the insert and round bar and subjecting to friction welding under the same condition as in Example 2.

This procedure was carried out as to the various combinations and the shearing strengths were measured to obtain results of 20 to 90 kg/mm$^2$.

EXAMPLE 4

A Ni sheet of 1 mm in thickness was bonded to the end surface of an insert of WC-5% Co alloy with a diameter of 10 mm and length of 10 mm by heating at 1320° C. in vacuum. A WC-15% Co alloy with a diameter of 10 mm and length of 100 mm was obtained by sintering, which had a layer consisting predominantly of Co and having a thickness of 0.2 mm at one end. These compacts were butted in such a manner that the metallic surfaces are contracted, turned for 2 seconds at 3000 rpm and a pressure of 100 kg and after raising the temperature to 2500 kg, they were stopped and cooled. Consequently, the compacts were bonded with each other over the whole surface through a Ni-Co layer of 0.1 mm in thickness. The shearing strength of the joint part was higher, i.e. 85 kg/mm$^2$, while a brazed sample for comparison showed a shearing strength of only 20 kg/mm$^2$.

EXAMPLE 5

Inserts of (Mo, W)C-10% Co alloy, (Ti-30% TiN)-10% (Ni-Mo) alloy and Cr$_3$C$_2$-10% Ni alloy were prepared and sheets of Ni, Co and Fe with a thickness of 1 mm were respectively bonded to one ends thereof by heating in vacuum in an analogous manner to Example 4. The thus bonded inserts were respectively bonded to a WC-25% Co alloy by friction welding for 3 seconds at 2000 rpm and a pressure of 1600 kg, the pressure being then raised to 3000 kg. The resulting various combinations showed all good bonded states. The shearing strengths measured were 75 kg/mm$^2$ at best and 40 kg/mm$^2$ at worst.

EXAMPLE 6

A composite compact as shown in FIG. 6 was obtained by sintering under an ultra-high pressure and high temperature. Diamond compact 1 with a diameter of 13 mm and a thickness of 0.7 mm was prepared by sintering about 91% by volume of diamond grains with Co as a binder under an ultra-high pressure and high temperature. Substrate 2 of (Mo, W)C-Ni-C, having a thickness of 2.9 mm, the bottom of which was bonded with a Ni sheet of 0.2 mm in thickness as joint material 4, was simultaneously bonded to diamond compact 1 when it was sintered.

Support 5 of a WC-15% Co alloy with a diameter of 14 mm and a length of 10 mm, one end surface of which was bonded with a Ni sheet of 1 mm in thickness as joint material 4', was prepared and contacted with the bottom surface of the composite compact for 2 seconds at a pressure of 3000 kg while turning support 5 at 3000 rpm as shown in FIG. 7 to heat the joint part. After the pressure was then increased to 2500 kg to allow the Ni to flow, the turning was stopped and the assembly was cooled.

The sample was taken out of friction welding machine to observe the joint part. Thus, it was found that the composite compact was bonded to the support through a Ni layer of 0.1 mm in thickness over the whole surface. Then, it was subjected to measurement of the shearing strength at the joint part.

For comparison, another sample was prepared by brazing the same composite compact and support with a silver brazing material corresponding to JIS B Ag-1 and subjected to measurement of the shearing strength.

The results were 85 kg/mm$^2$ at room temperature and 70 kg/mm$^2$ even at 400° C. in the case of the sample of the present invention and on the other hand, 20 kg/mm$^2$ in the 10 kg/mm$^2$ case of the comparative sample.

In the sample of the present invention, there was found no deterioration of the sintered diamond.

EXAMPLE 7

A composite compact as shown in FIG. 4 was prepared by sintering at an ultra-high pressure and high temperature. Diamond compact 1 with a diameter of 13 mm and a thickness of 0.5 mm was prepared by sintering about 90% by volume of diamond grains with Co as a binder at an ultra-high pressure and high temperature. Base 2 of WC-6% Co alloy having a thickness of 3 mm was simultaneously bonded to diamond compact 1 when it was sintered through interlayer 3 with a thickness of 30 μm, consisting of a compact of 60% by volume of CBN and TiN-10 wt. % Al.

Figure 8:
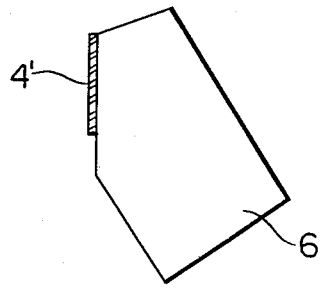
FIG. 8 is a schematic view of one example of a support for a composite tool, used in the present invention.

This composite diamond compact A was brought into contact with joint material 4' of a Ni-Cr alloy with a thickness of 1 mm bonded to support 6 of WC-12% Co cemented carbide, as shown in FIG. 8, which was then revolved at a pressure of 1100 kg and 2500 rpm to heat them for 1.5 seconds. The pressure was then increased to 3000 kg to allow the Ni-Cr to flow, the revolution was stopped and the assembly was cooled.

Three samples of the resulting composite diamond compact component were press-fitted in a bit body of SCM steel to obtain a core bit of three cutters with a diameter of 60 mm.

For comparison, a composite diamond compact comprising a commercially available diamond compact for a bit, bonded to a cemented carbide by brazing, was similarly press-fitted in a bit body of SCM steel to prepare a core bit.

When granite having a monoaxial compressive strength of 1800 kg/mm² was drilled at a rate of 60 mm/min by 30 m using these core bits, the core bit of the present invention was free from missing of the compact cutters and capable of further use, while the comparison bit using the commercially available composite diamond compact met with missing of the three diamond compacts from the brazed part.

EXAMPLE 8

A diamond compact having a thickness of 0.6 mm and comprising 90% by volume of diamond grains with a binder was directly bonded to a base of WC-20% Co alloy with a diameter of 14 mm to prepare a composite diamond compact blank with a thickness of 3.6 mm.

For the examination of the bonding strength by a joint metal, sheets of Ni, Co and Fe each having a thickness of 0.8 mm were prepared, respectively inserted in between the composite diamond compact and a WC-15% Co alloy having a length of 5 mm and heated for 3 seconds at a pressure of 1600 kg while revolving the WC-15% Co alloy at 2000 rpm. The pressure was then increased to 3000 kg to allow the metal sheet to flow and the revolution was stopped, followed by cooling.

The shearing strengths of the resulting samples measured at normal temperature were 88 kg/mm² in the case of using Ni as the joint material, 80 kg/mm² in the case of using Co and 50 kg/mm² in the case of using Fe.

EXAMPLE 9

A composite compact as shown in FIG. 6 was obtained by sintering under an ultra-high pressure and high temperature. BN compact 1 with a diameter of 8 mm and a thickness of 0.8 mm was prepared by sintering about 60% by volume of CBN with TiN and Al as binders under an ultra-high pressure and high temperature. Substrate 2 of WC-7% Co alloy having a thickness of 2.5 mm, the bottom of which was bonded with a Ni sheet of 0.2 mm in thickness as joint material 4, was simultaneously bonded to CBN compact 1 when it was sintered.

Support 5 of a WC-10% Co alloy with a diameter of 8 mm and a length of 5 mm, one end surface of which was bonded with a Ni sheet of 0.5 mm in thickness as joint material 4', was prepared and contacted with the bottom surface of the composite compact A for 0.5 second at a pressure of 800 kg while turning support 5 at 2400 rpm as shown in FIG. 7 to heat the joint part. After the pressure was increased to 1500 kg to allow the Ni to flow, the turning was stopped and the assembly was cooled.

Thereafter, the sample was taken out of the friction welding machine and burr occurring during the welding was removed to observe the joint part. Thus, it was found that the composite was bonded to the support cover over the whole surface through a Ni layer of 0.15 mm in thickness.

Figure 9:
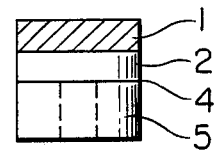
FIG. 9 and FIG. 10 are perspective views of other embodiments of a composite compact and composite compact tool according to the present invention.
Figure 10:
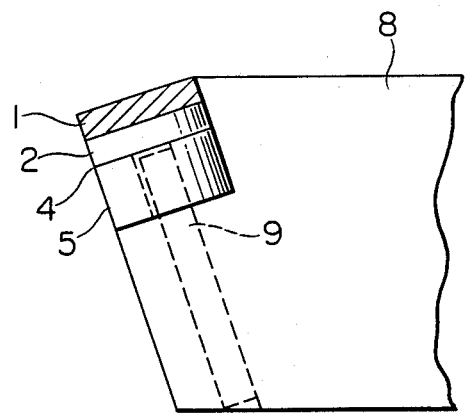

The thus resulting composite compact component was machined as shown in FIG. 9, fitted to tool holder 8 by means of a cramp 9 and then subjected to a cutting test of a hardened steel with an HRC of 62-65 under cutting conditions of a cutting speed of 100 m/min, cutting depth of 1 mm and feed of 0.3 m/rev.

For comparison, another composite compact component was prepared by bonding the same CBN composite compact to a support of WC-10% Co alloy with a diameter of 8 mm and a length of 5 mm using a silver brazing material corresponding to JIS B Ag-1 and subjected to a cutting test of a hardened steel under the same conditions as set forth above.

The results were that the sample of the present invention was capable of cutting for 60 minutes or longer, while the comparative sample met with missing of the cutter compact from the brazed part in 5 minutes.

EXAMPLE 10

A composite compact with a diameter of 3 mm was prepared comprising a composite containing about 70% by volume of BN grains sintered with a binder and having a thickness of 2 mm, bonded to a substrate of WC-10% Co alloy having a thickness of 3 mm. On the other hand, a support of WC-10% Co alloy having a diameter of 6 mm and a length of 80 mm was provided the bottom surface of which was bonded with a Co sheet of 0.3 mm in thickness.

These samples were fitted to a friction welding machine, where the composite compact was revolved and contacted with the substrate at a pressure of 600 kg for 1 second to heat the joint part, the pressure was increased to 1000 kg to allow the Co metal to flow and the revolution was stopped, followed by cooling. The composite BN compact was firmly bonded to the support of WC-10% Co alloy through a Co layer of 0.1 mm in thickness.

The resulting composite compact component was worked into a reamer with a diameter of 6 mm and then subjected to machining of a hole in a hardened steel of HRC 60-63 under conditions of a revolving speed of 2000 rpm, depth of cut of 0.5 mm and feed rate of 100 mm/min.

For comparison, another sample was prepared by bonding the same BN composite compact to the same substrate but using a silver brazing material corresponding to JIS A Ag-1 and subjected to machining of the hardened steel.

The results were that the sample of the present invention was capable of machining 500 or more holes, while the comparative sample met with missing of the cutter compact from the brazed part when 120 holes were machined. It is apparent therefrom that the present invention is superior to the prior art.

What is claimed is:

1. A process for producing a composite tool which comprises previously bonding a high strength metal or high strength alloy selected from the group consisting of Ni, Co and alloys thereof to at least one of the end surfaces of an insert and a support of a hard metal or hard alloy selected from the group consisting of steel and a hard sintered alloy, said support having a larger volume than the insert, revolving at least one of the insert and support at high speed, subjecting the high strength metal or alloy previously bonded onto at least one of said revolving end surfaces to friction and heating by contacting said revolving end surfaces with each other to cause the high strength metal or high strength alloy to flow and form an intermediate layer, thereby bonding the insert and support, said insert being selected from the group consisting of (1) a sintered alloy containing, as a predominant component, at least one member selected from the group consisting of WC, (Mo, W)C, TiC, TiN and Cr₃C₂, (2) a composite compact consisting of a diamond compact containing at least 50% by volume of diamond powder and a substrate of a hard sintered alloy bonded during sintering under an ultra-high pressure and high temperature directly or through an interlayer with a thickness of at most 0.5 mm to the diamond compact, and (3) a composite compact consisting of a BN compact containing at least 20% by volume of BN powder and a substrate of a hard sintered alloy bonded during sintering under an ultra-high pressure and high temperature directly or through an interlayer with a thickness of at most 0.5 mm to the BN compact; wherein the hard sintered alloy of the substrate of (2) or (3) is a cemented carbide consisting of at least one member selected from the group consisting of carbides, nitrides, carbonitrides of Group 4a, 5a and 6a elements of the Periodic Table, solid solutions and mixtures thereof, bonded with an iron group metal.

2. The process of claim 1 wherein the hard sintered alloy of the support has a larger content of a binder metal than the hard sintered alloy of the insert.

3. The process of claim 1 wherein the friction welding is carried out in the presence of a heat sink.

4. The process of claim 3, wherein the heat sink is copper.

5. The process according to claim 1, wherein the insert and support are both made of cemented carbides consisting of at least one member selected from the group consisting of carbides, nitrides, carbonitrides of Group 4a, 5a and 6a elements of the Periodic Table, solid solutions and mixtures thereof, bonded with an iron group metal and wherein the hard strength metal alloy is selected from the group consisting of Ni, Co and alloys thereof, said intermediate layer being substantially free of a mixed carbide phase due to the interreaction of the cemented carbides and the support or insert with the hard metal or alloy during bonding.

* * * * *